United States Patent
Pajuniemi et al.

(10) Patent No.: US 8,821,729 B2
(45) Date of Patent: Sep. 2, 2014

(54) CARRIER ELEMENT, BIOLOGICAL WATER TREATMENT SYSTEM AND THEIR USE, AND METHOD FOR BIOLOGICALLY TREATING WASTE WATER

(75) Inventors: Petri Pajuniemi, Turku (FI); Mikko Siivonen, Pilttikatu (FI)

(73) Assignee: Flootech Oy, Turku (FI)

( * ) Notice: Subject to any disclaimer, the term of this patent is extended or adjusted under 35 U.S.C. 154(b) by 0 days.

(21) Appl. No.: 13/320,086

(22) PCT Filed: May 14, 2010

(86) PCT No.: PCT/FI2010/050389
§ 371 (c)(1),
(2), (4) Date: Nov. 11, 2011

(87) PCT Pub. No.: WO2010/130881
PCT Pub. Date: Nov. 18, 2010

(65) Prior Publication Data
US 2012/0055870 A1    Mar. 8, 2012

(30) Foreign Application Priority Data

May 14, 2009 (EP) .................................... 09160248

(51) Int. Cl.
*C02F 3/10* (2006.01)
*B01J 10/00* (2006.01)
*B01J 19/30* (2006.01)

(52) U.S. Cl.
CPC .......... *C02F 3/10* (2013.01); *B01J 2219/30466* (2013.01); *B01J 2219/30226* (2013.01); *B01J 2219/3183* (2013.01); *B01J 2219/30475* (2013.01); *B01J 10/002* (2013.01); *B01J 2219/319* (2013.01); *B01J 19/30* (2013.01)
USPC ............................. 210/615; 210/620; 210/624

(58) Field of Classification Search
CPC .... B01J 10/002; B01J 2219/319; B01J 19/30; B01J 2219/30475; B01J 2219/30466; B01J 2219/30226; B01J 2219/3183; C02F 3/10
USPC ................. 210/615, 150, 151, 96.1, 620, 624
See application file for complete search history.

(56) References Cited

U.S. PATENT DOCUMENTS

| 3,914,351 | A | * | 10/1975 | McKeown et al. ............... 261/98 |
| 4,566,971 | A | * | 1/1986 | Reimann et al. ............... 210/616 |
| 5,032,325 | A | * | 7/1991 | Tharp ............................ 261/124 |
| 5,217,616 | A | * | 6/1993 | Sanyal et al. .................. 210/617 |
| 5,393,427 | A | * | 2/1995 | Barnard ........................ 210/605 |
| 5,395,528 | A | * | 3/1995 | Audic et al. ................... 210/617 |
| 6,126,829 | A | * | 10/2000 | Gunnarsson et al. ......... 210/616 |
| 8,226,828 | B2 | * | 7/2012 | Cantwell et al. .............. 210/605 |
| 2007/0199878 | A1 | | 8/2007 | Eisberg et al. |

FOREIGN PATENT DOCUMENTS

CN    2357002    Y    1/2000
DE    102004062915    *    3/2004

OTHER PUBLICATIONS

English machine translation of DE102004062915, 2004.*

* cited by examiner

*Primary Examiner* — Nam Nguyen
*Assistant Examiner* — Claire Norris
(74) *Attorney, Agent, or Firm* — James Earl Lowe, Jr.

(57) ABSTRACT

The invention relates to a carrier element for an aerobic biological water treatment system. The carrier element has a first end and a second end at a distance from each other, the maximum diameter of the first end being larger than the maximum diameter of the second end. It also has biofilm growing surface structures that extend from the first end to the second end and from inner part of the element towards periphery of the element and at least two support structures that encircle the growing surface structures at the periphery of the element and connect the growing surface structures to each other. The support structures define the outer boundary surface of the carrier element, whereby the support structures are spaced from each other so that apertures allowing access to the biofilm growing surface structures are formed between the support structures. The invention relates also to a water treatment system employing the carrier elements.

24 Claims, 3 Drawing Sheets

Figure 1:
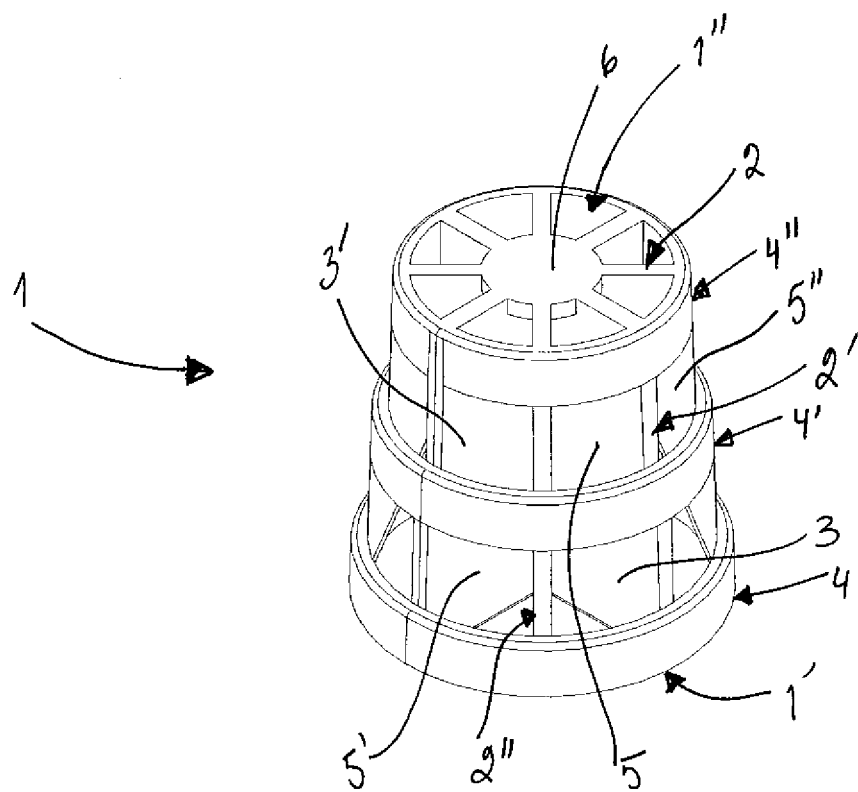

CARRIER ELEMENT, BIOLOGICAL WATER TREATMENT SYSTEM AND THEIR USE, AND METHOD FOR BIOLOGICALLY TREATING WASTE WATER

The invention relates to a carrier element and to a biological water treatment system according to the preambles of the enclosed claims. The invention relates also to use of the carrier element or the biological water treatment system and to a method for biologically treating waste water.

TECHNICAL FIELD

In biological water treatment the water is passed through a reactor, where micro-organisms are used to convert impurities to harmless end products. In the reactor the micro-organisms can be grown suspended or as biofilm on fixed surfaces or on carrier elements, which form a floating bed inside the reactor body. When carrier elements are used for growing biofilm, the size of the surface area of the carrier element is of utmost importance. By increasing the surface of the carrier element it is possible to increase the surface area provided for biofilm growth. However, this often increases the structural complexity of the carrier element.

The water treatment process may be conducted aerobically, which means that oxygen or air is supplied to the reactor. A large amount of oxygen is consumed in the process because of biochemical oxidation of organic and inorganic compounds. At the same time the mass of the biofilm increases on the carrier surfaces due to growth and bounding of solids. However, wastewater impurities, oxygen and micro-organisms should be able to maintain a sufficient contact with each other in order to guarantee the purification results.

It has been sometimes assumed that in a process employing freely moving carriers in a reactor the mechanical abrasion and high flow rates might wear away biofilm growing on the carrier surfaces, which could reduce the efficiency of the process. This assumption has led to an attempt to reduce the flow rate through the carrier by increasing the structural complexity and the size of the carrier.

A known problem in the existing processes is the carrier clogging caused by excess sludge growth and precipitation, especially when carrier elements with complex structure are used. If the biofilm on the carrier surface grows too much, and the carrier is clogged, the purification results of the process are deteriorated. The micro-organisms do not come into contact with the water impurities and/or oxygen. The problem may be solved by increasing the mixing through air supply to the reactor, which increases the energy consumption of the process.

One effort to solve the problem of clogging has been made by increasing the size of the carrier element. Document EP 750 591 discloses the use of carrier elements which have the surface thereof partly protected against collision with the surfaces of other carrier elements in a biological water or wastewater purification process. The carrier elements have a length, width and/or height exceeding 1.5 cm, preferably in the interval ranging from 2.5 to 10 cm, particularly in the interval ranging from 3 to 6 cm.

Document EP 575 314 discloses a method for water purification in which waste water is allowed to flow through a reactor containing carriers on which biofilm is grown. The carriers are in the form of pieces of a tube with linear dimensions in the range 0.2-3 cm, particularly 0.5-1.5 cm and manufactured of soft plastic by extrusion method. The aim has been to maximise the surface area of the carrier for biofilm growth.

Document DE 102 31 217 A1 discloses a tubular element manufactured by extruding and intended to be used as a packing element in stationary packed beds. The element has a unitary diameter through its body length, but its ends may be straight or conical.

OBJECT AND SUMMARY OF THE INVENTION

An object of this invention is to minimise or even eliminate the disadvantages existing in the prior art.

An object is also to provide a carrier element that minimises the risk for carrier element clogging.

A further object of this invention is to provide a carrier element and method that enables an effective contact between the biofilm and the impurities and oxygen in the water.

A still further object of the invention is to provide a carrier element and a biological water treatment system with which the energy consumption of the treatment process may be decreased.

These objects are attained with the present invention having the characteristics presented below in the characterising parts of the independent claims.

DETAILED DESCRIPTION OF THE INVENTION

Typical carrier element according to the present invention for an aerobic biological water treatment system has
  a first end and a second end at a distance from each other, the maximum diameter of the first end being larger than the maximum diameter of the second end,
  biofilm growing surface structures that extend from the first end to the second end and from inner part of the element towards periphery of the element and,
  at least two support structures that encircle the growing surface structures at the periphery of the element and connect the growing surface structures to each other, the support structures defining the outer boundary surface of the carrier element, whereby the support structures are spaced from each other so that apertures allowing access to the biofilm growing surface structures are formed in the periphery of the element between the support structures.

Typical biological water treatment system according to the present invention comprises a treatment reactor, which has a reactor volume defined by reactor wall(s) and bottom, which reactor volume comprises freely moving carrier elements according to the invention.

Typical method for biologically treating waste water according to the present invention comprises
  leading water to be treated or purified to a treatment reactor comprising carrier elements which are freely moving, suspended in the water, in the treatment reactor and on which a biofilm is grown,
  feeding air or oxygen to the treatment reactor, and
  leading treated or purified water away from the treatment reactor,
  using carrier elements according to the invention in the treatment reactor.

Now it has been surprisingly found out that by proper design of the carrier element it possible to obtain a carrier element which provides a high surface area and, at the same time, an open structure that enables the micro-organisms of the biofilm come into contact with impurities in water and oxygen. The open structure of the carrier element according to the present invention ensures an effective flow through and flushing of the carrier element, whereby excessive biofilm growth on the internal walls and clogging of the carrier element are prevented or at least minimised. The carrier element has also a support structure that protects the internal walls of the element and makes it mechanically strong. All these properties make the carrier element more effective and more energy efficient whereby the energy consumption of the treatment process may be reduced, either by downscaling of the size of the reactor or by using less added aeration for mixing and for oxygen supply.

Carrier element according to the present invention comprises biofilm growing surface structures that are also in this application called internal walls. These two terms are in this context completely interchangeable. The internal walls are long flat structures that function as surfaces on which the biofilm grows. The internal walls form a cross-like or a star-like structure and they extend towards the peripheral surface of the carrier element. Preferably all internal walls of the carrier element extend from a starting point in the centre of the element towards the periphery of the element, and they are typically in contact with each other at the starting point. In other words, the central longitudinal axis of the carrier element may be closed for water flow and the carrier element may comprise a solid longitudinal axis to which the internal walls are attached. The internal walls give added mechanical strength to the carrier element structure, especially when the overall size of the element is small. Typically, a carrier element according to the present invention has 4 to 8 internal walls, more preferably 6 to 8 internal walls. The internal walls are preferably arranged in symmetrical star-like arrangement, so that the individual walls are equidistantly spaced from each other. The wall thickness is typically 0.2-1.0 mm, more typically 0.4-0.8 mm.

According to one embodiment of the invention every other of the internal walls may be shaped as a triangle, preferably as a right-angled triangle. When the internal wall has triangular shape, the base of the triangle is situated at the second end of the carrier element, where it is arranged in connection with the other internal walls. The vertex of the triangular wall is arranged in connection with a support structure at the first end of the carrier element.

The reinforcing support structures of the carrier element are arranged to encircle the internal walls at the periphery of the element, thus further increasing the mechanical strength of the carrier element. Typically the support structures are narrow belt-like structure that surrounds the internal walls in the periphery of the element. The support structures defining the outer boundary surface of the carrier element. This means that the support structures define the partially virtual outer boundary surface of the carrier element. Usually there is more than one support structure, typically two support structures, more typically three support structures. In case of three support structures, the first structure is typically arranged near the first end of the carrier element, the second is arranged near the second end of the carrier element and the third in the middle section between the first and second end. The reinforcing support structure is normally continuous ring-like structure having a certain height in carrier element's length direction. It is also possible that an individual support structure is made of a plurality of thin string-like members, which are twisted together or arranged at short distance from each other. In case the support structure is made from a plurality of thin string-like members, the distance between adjacent support structures is clearly larger than the distance between adjacent string-like members of the individual single support structure.

The support structure also connects the internal walls to each other at the periphery of the carrier element. Thus lateral openings or apertures are formed to the peripheral surface of the carrier element. The apertures enable the efficient entry of water and air to the inner part of the carrier element. Efficient flow through and flushing the carrier element is not important only in view of the mass transfer of oxygen, substrates and metabolism in and out from the inner part of the carrier element, but the flow also exposes the biofilm on the surfaces of the internal walls for abrasion which decreases the excessive growth of the biofilm and minimises the risk for the clogging of the element. For example, the carrier element may have 16 lateral apertures at periphery of the element that give a high total openness for the element.

The growing surfaces and support structures of the carrier element define also void spaces inside the carrier element. The carrier element of the present invention is designed so that the openness of the carrier element is maximised, whereby an effective mass transfer is maintained even in the situations when the carrier element comprises high amount of biofilm on growing surfaces and other solids inside its structure. According to one embodiment of the invention the apertures in the outer boundary surface in the periphery of the carrier element body against the cross sectional area of a similar solid element boundary surface are over 42%, preferably over 45%, more preferably over 48%, still more preferably over 50%. The high surface area and openness of the carrier element also enable very efficient biofilm activity and thus high treatment efficiency. The open structure of the carrier makes it possible also to increase the concentration of suspended solids in the incoming wastewater flow and inside the reactor compared to treatment processes using prior art carrier elements.

According to one embodiment of the invention the carrier element is conical in shape and/or the cross-sections of the first and second ends are circular. The conical shape of the carrier element improves the movement and rotation of the element in the reactor during the mixing. According to one preferred embodiment the diameter of a carrier increases from the second end towards the first end of the carrier. This means that the diameter of the first end is at least 15%, typically 20-55%, more typically 25-40%, most typically 30-35% larger than the diameter of the second end. It has been noticed that the energy efficiency of the process may be improved even by 30% compared to conventional systems when small conical carrier elements according to the present invention are used.

According to one embodiment of the invention the first end of the carrier element has a diameter in the range of 11.0-13.6 mm, preferably 11.7-13.1 mm, more preferably 12.3-12.7 mm.

According to one embodiment of the invention the second end of the carrier element has a diameter in the range of 8.5-11.3 mm, preferably 9.1-10.8 mm, and particularly more preferably 9.4-10.5 mm.

According to one embodiment of the invention the ratio of the diameter of the first end and the diameter of the second end of the carrier element is over 1.2, preferably over 1.25, more preferably over 1.29.

According to one embodiment of the invention the length of the carrier element', measured perpendicularly from the first end to the second end, is 11.0-14.9 mm, preferably 11.6-13.8 mm, more preferably 12.2-12.7 mm.

The size and design of the carrier element enable the carrier elements to move effectively in the whole reactor volume when mixing is achieved by using the aeration system of the reactor. This ensures a proper mixing of the carrier elements with the water to be treated and a continuous contact to air, water and substrates. Thus the whole reactor volume is efficiently mixed and consequently there is no "dead" or "unused" space inside the reactor. This means that in order to achieve the same treatment results as with conventional reactor systems it is possible to scale down the reactor size and/or the carrier filling degree. A smaller reactor needs less aeration and less mixing, whereby the overall energy consumption of the treatment process is decreased. On the other hand by using the carrier elements according to the present invention and a reactor of conventional size, it is possible to increase the treatment capacity of the process.

At the same time, the size and design of the carrier element provide a large carrier surface for biofilm growing and optimal flowing conditions inside and around the carrier element. The carrier construction effectively prevents the clogging of the carrier interior, provides a adequate flow of oxygen and impurities to the biofilm, but at the same time protects the biofilm from abrasion and washing away.

Density of the carrier element is normally close to density of the water at process temperature. This guarantees that the carrier elements are kept suspended throughout the reactor volume, and they are not accumulated to the top or bottom of the reactor. Typically the density of the carrier element is 0.92-0.99 $kg/dm^3$, preferably 0.93-0.98 $kg/dm^3$, more preferably 0.94-0.97 $kg/dm^3$.

According to one embodiment of the invention the carrier element is made of hard plastic material, such as polyethylene, polypropylene or their mixture, by injection moulding. Carrier element is preferably made of polyethylene, more preferably recycled polyethylene. When the small carrier elements are made by injection moulding from hard plastic the resulting element structure is stable and mechanically durable even if the carrier element circumference and periphery are kept open. Good mechanical strength of the element increases the overall lifetime of the carrier element, thus reducing costs that are associated with the renewal of carrier elements due to mechanical wear and breakdown. Carrier element may be made of recycled or virgin plastic material.

According to one embodiment of the invention the biological water treatment system comprises two or more treatment reactors arranged in parallel or in series. In other words, it is possible to operate water treatment process utilising the carrier elements according to the present invention in one or several stages, which stages may be operated in series or in parallel. In order to keep the carrier elements according to the present invention inside the reactor screens are placed to the outlet and inlet of the reactor. Thus outflow of the carrier elements from the reactor is prevented.

According to one embodiment of the invention the filling degree of carrier elements in the reactor is between 14-28 volume-%, preferably 16-26 volume-%, more preferably 18-25 volume-%, still more preferably 20-25 volume-% of the total reactor volume. The filling degree is lower than in the prior art processes using conventional carrier elements. The carrier elements according to the invention have high surface area and very efficient mass transfer to and from the biofilm, whereby treatment efficiency is achieved with lower number of the carrier elements. The low filling degree of the carrier elements in the reactor improves generally the process and mixing efficiency of the carrier elements, which decreases both the need of mixing energy and the clogging tendency of the outlet screen.

According to one embodiment of the invention treated or purified water is led to a clarifier, and sludge is recycled from the clarifier back to the treatment reactor. Thus the biological water treatment system comprises a clarifier arranged after the treatment reactor and connections for recycling sludge from clarifier back to treatment reactor. Thus a part of the sludge may be recycled back from the clarifier to treatment reactor comprising carrier elements according to the present invention. The open and mechanically strong structure of the carrier element tolerates also returning of recycled sludge without clogging. Addition of sludge to the treatment reactor makes it also possible to further increase the process efficiency by increasing the biomass inside the reactor or reduce the filling degree of the reactor as a part of the biofilm may be replaced by recycled sludge.

It is possible to arrange in the upper part of the treatment reactor an output connection, which is connected to the clarifier. According to one embodiment of the invention treated or purified water is led away from the upper part of the treatment reactor.

According to one embodiment of the volume of the returned and/or recycled sludge flow is normally 2-15 volume-%, preferably 3-12 volume-%, more preferably 5-10 volume-% of the incoming flow of water to be treated or purified. The clarifier may be any type of gravity settler, dissolved air flotation (DAF), or it may be a lamella clarifier. Generally the returning of the sludge to the reactor supports the growth of microorganisms. Earlier it is assumed that this would lead to excessive biofilm growth and clogging of the carrier elements. The openness of the carrier element according to the present invention allows the sludge return to the reactor without risk of clogging. With the return sludge a higher biomass concentration and higher diversity of microorganisms is achieved inside the reactor employing carrier elements according to the present invention. Use of return sludge also significantly shortens the start-up time of the biological water treatment process.

The biological water treatment system according to the present invention may take care of the whole biological treatment of the purification process. It is also possible to arrange an activated sludge process between the treatment reactor and clarifier. In this case the water/sludge mixture is led from the treatment reactor comprising the carrier elements to an activated sludge process, from which the overflow comprising mainly water phase is led to the following clarifier. The biological water treatment system may also be placed after an anaerobic treatment stage.

A water treatment reactor comprising carrier elements according to the present invention arranged in front of an activated sludge process improves also the functioning of the activated sludge process. Quality of sludge is especially improved, which means that the quality of the microorganisms in the sludge is good and sludge is easily separable and sedimentable.

The treatment capacity of the treatment system may be varied by changing the biomass concentration in the treatment reactor. This can be done via changing the volume of the return sludge flow and/or by changing the filling degree of the carrier media. For example, as the carrier elements according to the present invention allow the return of the sludge to the reactor, it is possible to react faster to changes in the incoming wastewater quality and treatment process circumstances by changing the return sludge flow. This makes the whole treatment process more tolerant against peaks of organic load and variations in incoming flow rate.

According to one embodiment of the invention the biological water treatment system comprises a reactor having a bottom aeration system comprising one or more grid-like aeration elements. The bottom aeration system enables the carrier elements to move freely in the whole reactor volume having continuous contact to air, water and substrates. Sufficient mixing with low aeration energy consumption is ensured by the new carrier design and properly designed and implemented aeration system. The bottom aeration system comprising grid-like aeration elements is in direct contact with the total treatment reactor volume and with the carrier elements. In other words, it has not been separated from the carrier elements by a screen or the like. The carrier elements may have direct physical contact with the aeration system elements, without the aeration system elements being subjected to detrimental wear or impacts. Thus it is not necessary to divide the treatment reactor volume to different zones or "compartments", but the treatment reactor volume is preferably one single undivided three-dimensional space.

Preferably the aeration system covers the whole bottom of the reactor vessel and creates optimum mixing and sufficient aeration for the process. The tubular aeration system comprises a number of grid-like aeration elements, which comprise a main air feed pipe and a number of air diffusers arranged perpendicularly to the air feed pipe. Air/oxygen is led to inside the aeration system tubes inside the main air feed pipe and from it to air diffusers. The air/oxygen emerges from the air diffuser perforations as small air bubbles.

According to one embodiment of the invention one or several of the air diffusers may be made of plastic material, such as polyethylene or polyester. Use of plastic material in air diffusers enables production of smaller perforations to the diffusers, whereby also the size of the bubbles emerging from the perforations is reduced. Small bubble size gives more contact surface between the air bubble and water and microorganisms in the reactor. This makes the oxygen transfer to water and to microorganisms more efficient, whereby the same aeration result is obtained by less consumption of air. This leads significant savings in energy.

The aeration system may also be arranged to be self-flushing, thus preventing the main air feed pipes and diffusers from blocking and requiring minimum amount of maintenance work from the operating personnel. Small pipe-like protrusions are arranged to the lower side of the main air feed pipes of the aeration grids. These protrusions are open to the surroundings and the aeration system may be flushed through these protrusions automatically. This prevents the contamination of the main air feed pipes and diffusers by excessive growth of microorganism or by accumulation of dirt inside them.

According to one embodiment of the invention the carrier elements are brought in a counterclockwise rotation against the incoming feed flow in the reactor. This counter current mixing prevents or minimises the possibility of straight flow from the feed inlet to outlet screen and ensures sufficient delay time for effluent inside the reactor. The rotation direction of the carrier elements in the reactor may be adjusted with air distribution valves.

According to one embodiment of the invention the water treatment system comprises an oxygen sensor that is arranged in connection with the treatment reactor to measure oxygen concentration in the reactor and an adjustment means for adjusting the aeration of the reactor according to the measured oxygen concentration. Thus it is possible to optimise the aeration energy consumption by continuously measuring oxygen concentration in the reactor by using suitable oxygen sensors and by adjusting the aeration of the reactor according to the measured oxygen concentration. Thus unnecessary aeration, which is performed only in order to be on the safe side, is decreased. The oxygen sensor is preferably arranged on the outlet of the treatment reactor, where it may be protected by a reactor outlet screen, which prevents the collision of the carrier elements to the oxygen sensor. The aeration of the reactor may be adjusted on-line or continuously with the adjustment means based on the measurement values obtained from the sensor.

The aeration system described in this application may be used also with other carrier elements, differing from those described in this application. The aeration system may still provide a number of benefits and advantages.

Typical carrier element or the biological water treatment system according to the present invention is used for treating or purifying waste water from food and/or beverage industry, petrochemical industry or municipal waste water. In some advantageous embodiments of the invention the waste water to be treated is essentially free of fibres.

Typical carrier element or the biological water treatment system according to the present invention is used for treating or purifying waste water having a value for the chemical oxygen demand (COD) of at least 200 mg/l, typically 300-4000 mg/l, more typically 400-2000 mg/l, most typically 500-1500 mg/l.

FIGURES

The figures are to be taken as purely schematical and are not to be construed as limiting the scope of the claims. The invention is described in more detail with reference to the enclosed figures, where FIG. 1 shows a carrier element according to one embodiment of the present invention, FIG. 2 shows a side view of a carrier element according to one embodiment of the present invention, FIG. 3A shows a top view of a carrier element according to one embodiment of the present invention, FIG. 3B shows a bottom view of a carrier element according to one embodiment of the present invention, and FIG. 4 shows schematically a water treatment process according to one embodiment of the present invention.

In FIG. 1 is shown a carrier element according to one embodiment of the present invention. The carrier element 1 has a first circular end 1' and a second circular end 1". A number of internal walls 2, 2', 2" extend from the first end 1' to the second end 1". Internal wall 2 has a shape of a triangle, whereas internal wall 2' is quadrangular in shape. The internal walls 2, 2', 2" provide flat continuous surfaces 3, 3' for growing of the biofilm. Support structures 4, 4', 4" surround the internal walls 2, 2', 2" and define the periphery of the carrier element 1. Support structures 4, 4', 4" make also the carrier element structure resistant for abrasion and mechanical stresses. At the same time the support structures 4, 4', 4" are spaced so widely apart from each other that apertures 5, 5', 5" are formed to the periphery of the carrier element 1. These apertures 5, 5', 5" enable the transport of impurities, water and oxygen in and out of the carrier element 1 and to the biofilm growing on the surfaces of the internal walls 2, 2', 2".

Figure 2:
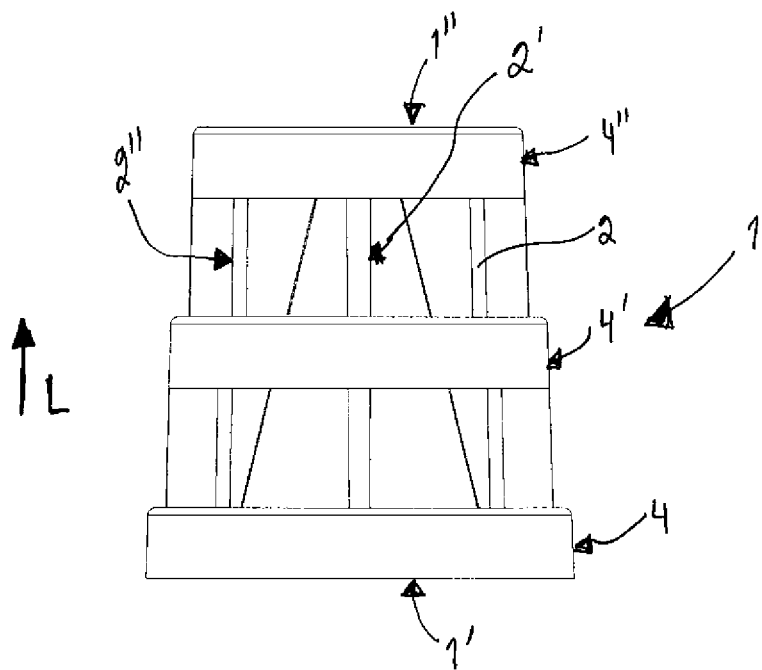

In FIG. 2 is shown a side view of a carrier element according to one embodiment of the present invention. The reference numbering corresponds to that of FIG. 1. It can be observed that the carrier element 1 is slightly conical, meaning that the diameter of the first end 1' is larger than the diameter of the second end 1". In the embodiment shown in FIG. 2 all the support structures 4, 4', 4" have the same width in the length direction L of the carrier element 1, indicated in the FIG. 2 by an arrow L. It is also possible that the width of the support structures 4, 4', 4" may vary from each other.

Figure 3A:
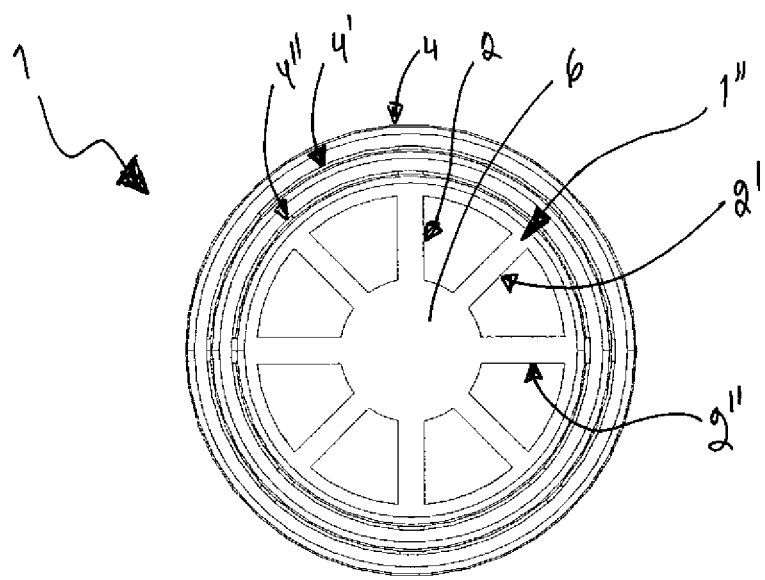
Figure 3B:
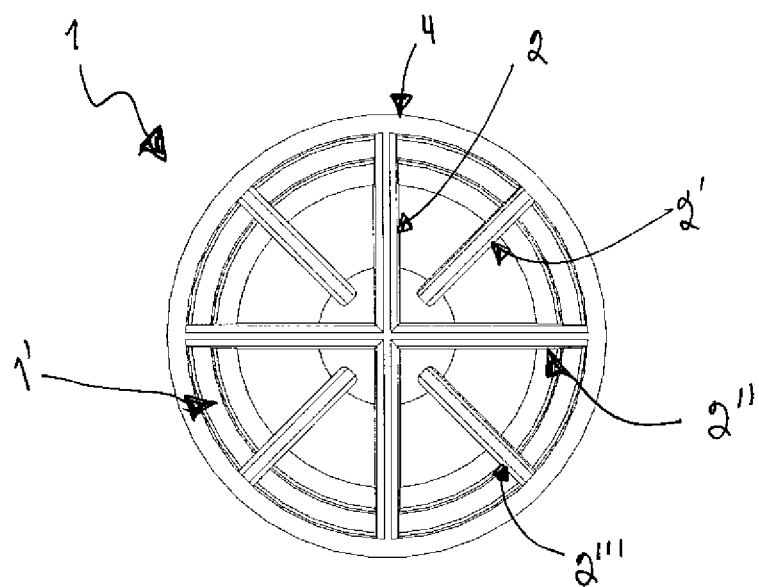
Figure 4:
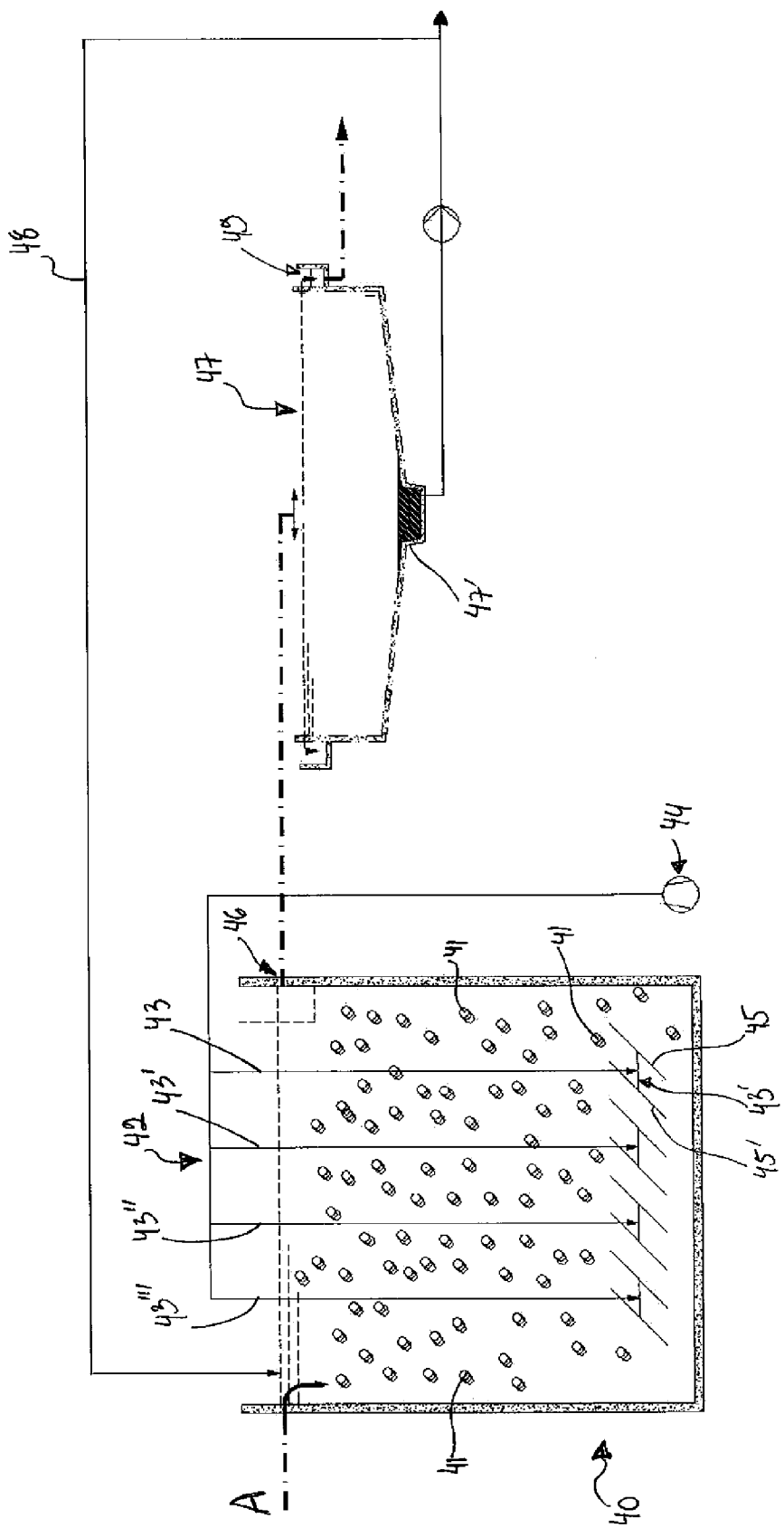

In FIG. 3A is shown a top view of a carrier element according to one embodiment of the present invention. The support structures 4, 4', 4" can be observed due to the conical shape of the carrier element 1, as the diameter of the individual support structures is decreasing towards the second end 1" of the carrier element. Thus the first support structure 4 has a larger diameter than the following and the last support structure 4', 4". The internal walls 2, 2', 2" are connected with each other in the second end 1" of the carrier element 1 by a plate 6.

In FIG. 3B is shown a bottom view of a carrier element according to one embodiment of the present invention. The reference numbering corresponds to that of preceding Figures. First internal walls 2, 2" are connected to each other in the first end 1' of the carrier element 1, at the centre of the element, and forming a cross-like structure. Second the internal walls 2', 2'" do not reach to the centre of carrier element 1 in the first end 1' of the element 1 and they do not connect with each other or with the first portion of the internal walls. One second internal wall 2', 2'" is situated in between two of the first internal walls 2, 2". All the internal walls are connected with each other at the periphery of the carrier element by the aid of support structures 4, 4'.

In FIG. 4 is shown schematically a water treatment process according to one embodiment of the present invention. Water to be treated A is led to a treatment reactor 40 comprising carrier elements 41 according to the present invention. Air or oxygen is fed to the reactor 40 by using an aeration system 42 comprising a number of grid-like aeration elements 43, 43', 43", 43'". Air or oxygen is fed to the aeration system 42 by using a blower 44. One aeration element 43 comprises a main air feeding pipe 43' and a number of air diffusers 45, 45'. Small holes or perforations (not shown) are formed to the air diffusers, so that the air can be expelled from the aeration system 42 in form of small bubbles. The formed bubbles keep the carrier elements 41 in the move and suspended in whole volume of the reactor 40.

An output connection 46 is arranged in the upper part of the treatment reactor 40, from which connection biologically treated water is taken out of the reactor 40 and led to the clarifier unit 47. In the clarifier unit 47 the treated water is allowed to settle, so that sludge is sedimented on the bottom 47' of the clarifier unit 47. From the bottom 47' the sludge is taken out, and a part of it is recirculated back to treatment reactor 40 by using pipeline 48. Purified water is taken out from the upper part of the clarifier unit 47 through connection 49.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. Carrier element for an aerobic biological water treatment system, the carrier element having—a first end and a second end at a distance from each other, the length of the carrier element, measured from the first end to the second end, being 11.0-14.9 mm, the maximum diameter of the first end being larger than the maximum diameter of the second end,
   growing surface structures, configured to support the growth of a biofilm, which are internal walls that extend from the first end to the second end and from inner part of the element towards periphery of the element, wherein at least one of said internal walls is triangular shaped, and at least one of said internal walls is quadrangular shaped, the triangular shaped wall having a side at the second end, and a vertex at its first end,
   a solid longitudinal central axis to which the internal walls are attached, and,—at least two support structures that encircle the growing surface structures at the periphery of the element and connect the growing surface structures to each other, the support structures defining the outer boundary surface of the carrier element, whereby the support structures are spaced from each other so that apertures allowing access to the biofilm growing surface structures are formed only between the support structures and the internal walls, the density of the carrier element being 0.92-0.99 kg/dm3.

2. Carrier element according to claim 1, characterized in that the first end has a diameter in the range of 11.0-13.6 mm.

3. Carrier element according to claim 1 characterized in that the second end has a diameter in the range of 8.5-11.3 mm.

4. Carrier element according to claim 1, characterized in that the ratio of the diameter of the first end and the diameter of the second end is over 1.2.

5. Carrier element according to claim 1, characterized in that the apertures in the outer boundary surface of the carrier element against the cross sectional area of a similar solid element boundary surface are over 42%.

6. Carrier element according to claim 1, characterized in that it is made of hard plastic material.

7. Carrier element according to claim 1, characterized in that the cross-sections of the first and second ends are circular.

8. Carrier element according to claim 1, characterized in that the carrier element is made of injection molded plastic.

9. Biological water treatment system comprising a treatment reactor, which has a reactor volume defined by reactor wall(s) and bottom, which reactor volume comprises freely moving carrier elements, each carrier element having—a first end and a second end at a distance from each other, the length of the carrier element, measured from the first end to the second end, being 11.0-14.9 mm, the maximum diameter of the first end being larger than the maximum diameter of the second end,
   growing surface structures, configured to support the growth of a biofilm, which are internal walls that extend from the first end to the second end and from inner part of the element towards periphery of the element, wherein at least one of said internal walls is triangular shaped, and at least one of said internal walls is quadrangular shaped, the triangular shaped wall having a side at the second end, and a vertex at its first end,
   a solid longitudinal central axis to which the internal walls are attached, and,—at least two support structures that encircle the growing surface structures at the periphery of the element and connect the growing surface structures to each other, the support structures defining the outer boundary surface of the carrier element, whereby the support structures are spaced from each other so that apertures allowing access to the biofilm growing surface structures are formed only between the support structures and the internal walls, the density of the carrier element being 0.92-0.99 kg/dm3.

10. Biological water treatment system according to claim 9, characterized in that the filling degree of carrier elements in the reactor is between 14-28 volume-%, of the total reactor volume.

11. Biological water treatment system according to claim 9, characterized in that the reactor comprises a bottom aeration system comprising one or more grid-like aeration elements.

12. Biological water treatment system according to claim 11, characterized in that the grid-like aeration elements comprise a main air feed pipe and a number of air diffusers arranged perpendicularly to the air feed pipe.

13. Biological water treatment system according to claim 11, characterized in that the aeration elements comprise one or several air diffusers that are made of plastic material.

14. Biological water treatment system according to claim 11, characterized in that the aeration system is arranged self-flushing.

15. Biological water treatment system according to claim 9, characterized in that it comprises two or more treatment reactors arranged in parallel or in series.

16. Biological water treatment system according to claim 9, characterized in that it comprises a clarifier, selected from the group consisting of a gravity settler, dissolved air flotation (DAF), and lamella clarifier, arranged after the treatment reactor and connections for recycling sludge from clarifier back to treatment reactor.

17. Biological water treatment system according to claim 16, characterized in that in the upper part of the treatment reactor is arranged an output connection, which is connected to the clarifier.

18. Biological water treatment system according to claim 9, characterized in that it comprises an oxygen sensor that is arranged in connection with the treatment reactor to measure oxygen concentration in the reactor and an adjustment means for adjusting the aeration of the reactor according to the measured oxygen concentration.

19. Method for biologically treating waste water by—leading water to be treated or purified to a treatment reactor comprising carrier elements which are freely moving, suspended in the water, in the treatment reactor and on which a biofilm is grown, feeding air or oxygen to the treatment reactor, and leading treated or purified water away from the treatment reactor, characterized in using carrier elements in the treatment reactor, each carrier element having—a first end and a second end at a distance from each other, the length of the carrier element, measured from the first end to the second end, being 11.0-14.9 mm, the maximum diameter of the first end being larger than the maximum diameter of the second end, growing surface structures, configured to support the growth of a biofilm, which are internal walls that extend from the first end to the second end and from inner part of the element towards periphery of the element, wherein at least one of said internal walls is triangular shaped, and at least one of said internal walls is quadrangular shaped, the triangular shaped wall having a side at the second end, and a vertex at its first end, a solid longitudinal central axis to which the internal walls are attached, and,—at least two support structures that encircle the growing surface structures at the periphery of the element and connect the growing surface structures to each other, the support structures defining the outer boundary surface of the carrier element, whereby the support structures are spaced from each other so that apertures allowing access to the biofilm growing surface structures are formed only between the support structures and the internal walls, the density of the carrier element being 0.92-0.99 kg/dm3.

20. Method according to claim 19, characterized in leading treated or purified water to a clarifier, and recycling sludge from the clarifier back to treatment reactor.

21. Method according to claim 20, characterized in that the volume of the recycled sludge flow is 2-15 volume-% of the incoming flow of water to be treated or purified.

22. Method according to claim 19, characterized in leading treated or purified water away from the upper part of the treatment reactor.

23. Method according to claim 19, characterized in rotating the carrier elements in a counterclockwise direction against the incoming feed flow in the treatment reactor.

24. Method according to claim 19, characterized in leading the sludge from the treatment reactor to an activated sludge process located between the treatment reactor and clarifier.

* * * * *